United States Patent
Lowery et al.

(10) Patent No.: US 6,564,824 B2
(45) Date of Patent: May 20, 2003

(54) MASS FLOW METER SYSTEMS AND METHODS

(75) Inventors: Patrick A. Lowery, San Clemente, CA (US); Petur Thordarson, Carlsbad, CA (US); Robert Laragione, Gordonville, PA (US)

(73) Assignee: Flowmatrix, Inc., Carlsbad, CA (US)

( * ) Notice: Subject to any disclaimer, the term of this patent is extended or adjusted under 35 U.S.C. 154(b) by 0 days.

(21) Appl. No.: 10/081,174

(22) Filed: Feb. 21, 2002

(65) Prior Publication Data

US 2002/0174898 A1 Nov. 28, 2002

Related U.S. Application Data

(60) Provisional application No. 60/283,596, filed on Apr. 13, 2001.

(51) Int. Cl.[7] .................................................. G05D 7/06
(52) U.S. Cl. .................. 137/487.5; 137/48; 73/861.52; 73/861.62; 700/282; 251/118
(58) Field of Search ..................... 73/1.16, 1.25, 73/861, 861.42, 861.52, 861.53, 861.61, 861.62; 137/1, 486, 487, 487.5; 138/40, 45, 46; 700/282; 702/47, 100; 251/118, 120, 121

(56) References Cited

U.S. PATENT DOCUMENTS

| | | | |
|---|---|---|---|
| 3,724,503 A | * 4/1973 | Cooke .......................... 138/45 |
| 3,817,099 A | * 6/1974 | Bubniak et al. ............... 138/46 |
| 4,015,626 A | 4/1977 | Thordarson |
| 4,096,746 A | 6/1978 | Wilson et al. |
| 4,210,171 A | 7/1980 | Rikuta |
| 4,406,161 A | * 9/1983 | Locke et al. .............. 73/861.52 |
| 4,419,898 A | * 12/1983 | Zanker et al. ............ 73/861.02 |
| 4,629,561 A | 12/1986 | Shirato et al. |
| 4,790,194 A | * 12/1988 | Bellows et al. .......... 73/861.53 |
| 4,796,651 A | * 1/1989 | Ginn et al. .................. 137/487 |
| 5,129,418 A | * 7/1992 | Shimomura et al. ........ 137/486 |
| 5,190,068 A | * 3/1993 | Philbin ........................ 137/486 |
| 5,329,966 A | 7/1994 | Fenimore et al. |
| 5,684,245 A | * 11/1997 | Hinkle ........................ 73/1.35 |
| 5,744,695 A | 4/1998 | Forbes |
| 5,791,369 A | 8/1998 | Nishino et al. |
| 5,865,205 A | 2/1999 | Wilmer |
| 5,911,238 A | * 6/1999 | Bump et al. .............. 137/487.5 |
| 5,925,829 A | * 7/1999 | Laragione et al. ............ 73/861 |
| 6,026,849 A | 2/2000 | Thordarson |
| 6,065,492 A | * 5/2000 | Bergamini ................... 137/487 |
| 6,138,708 A | * 10/2000 | Waldbusser .............. 137/487.5 |
| 6,152,162 A | 11/2000 | Balazy et al. |
| 6,360,772 B1 | * 3/2002 | Wu ............................. 137/486 |
| 6,363,958 B1 | 4/2002 | Ollivier |

FOREIGN PATENT DOCUMENTS

| | | |
|---|---|---|
| WO | WO 00/11530 | 3/2000 |

* cited by examiner

Primary Examiner—Michael Powell Buiz
Assistant Examiner—Ramesh Krishnamurthy
(74) Attorney, Agent, or Firm—Gordon E. Gray, III

(57) ABSTRACT

A flow meter system that calculates mass flow rate based only on a single pressure signal. A flow controller is arranged in parallel with a restriction such that a constant pressure differential is maintained across the restriction. The pressure, and temperature if not controlled, of the fluid flowing through the restriction is measured on either side of the restriction. The pressure is compared to a plot of pressure versus mass flow rate calculated for the specific restriction and fluid being measured. The constant pressure differential maintained across the restriction yields a linear relationship between pressure and flow rate. If temperature is not controlled, the plot of pressure versus mass flow rate will remain linear, but the slope of the curve will be adjusted based on the temperature of the fluid.

21 Claims, 9 Drawing Sheets

MASS FLOW METER SYSTEMS AND METHODS

This patent application claims priority based on provisional patent application U.S. Serial No. 60/283,596 filed on Apr. 13, 2001 which is fully incorporated herein by reference.

TECHNICAL FIELD

The present invention relates to systems and methods for measuring and controlling mass flow and, more specifically, to such systems and methods that allow precise measurement of mass flow using a flow restriction and pressure and temperature sensors.

BACKGROUND OF THE INVENTION

In many disciplines, the mass flow of a fluid must be measured with a high degree of accuracy. For example, in medical and semi-conductor manufacturing, gasses and liquids often need to be delivered in precise quantities to obtain desired results. Meters are used to measure the mass of the fluid actually delivered.

Conventional pressure-based mass flow meters employ a flow restriction, a temperature sensor, and pressure sensors for detecting the absolute pressure upstream of the flow restriction as well as the differential pressure across the flow restriction. Mass flow is determined from a table that correlates the pressure and temperature readings with predetermined mass flow rates. Such systems require at least two pressure sensors and a temperature sensor to account for fluid density, fluid velocity, and fluid viscosity under different temperatures and upstream and downstream pressures.

The need exists for mass flow meters that are simpler and require less complex calculations to determine true mass flow.

RELATED ART

U.S. Pat. No. 5,791,369 to Nishino et al. discloses a flow rate controller that, purportedly, requires only one functional pressure transducer. However, the controller disclosed in the '369 patent operates only in the sonic flow regime, and this system requires that the inlet pressure be twice the outlet pressure for the controller to function properly. The flow controller of the '369 patent thus operates only with very low flow rates, only with gases, and must have effective pressure regulation upstream. In addition, the '369 patent discloses the use of a second pressure transducer to determine when the downstream pressure is more than half of the inlet pressure, and the controller shuts down when this condition is met.

U.S. Pat. No. 6,152,162 to Balazy et al. discloses a fluid flow controller that requires two pressure measurements, one upstream and one downstream of a flow restrictor. The '162 patent does not measure mass flow. The '162 patent also employs a filter element as the flow restriction. Particles in the gas stream can clog the filter, thereby changing the relationship of pressure drop and flow characteristics of their flow restriction and possibly deviating from the initial calibration setting.

U.S. Pat. No. 6,138,708 to Waldbusser discloses a pressure compensated mass flow controller. The system described in the '708 patent combines a thermal mass flow controller with a thermal meter coupled to a dome-loaded pressure regulator. Another pilot pressure regulator using an independent gas source loads the dome of the pressure regulator upstream of the thermal mass flow controller. The pilot regulator and the mass flow controller are controlled by a microprocessor so that inlet pressure is controlled in concert with the flow rate resulting in an inlet pressure independent flow controller.

BRIEF DESCRIPTION OF THE DRAWINGS

FIG. 9 is a block diagram of an exemplary flow control system employing a mass flow meter system of the present invention.

DETAILED DESCRIPTION OF THE PREFERRED EMBODIMENTS

The following discussion is organized in a number of sections. In the first section, the basic operation and theory of the present invention will be described in the context of a mass flow meter system. The second and third sections will describe exemplary mechanical and electrical systems that may be used to implement the present invention. The fourth section will describe one method of calibrating a mass flow meter system constructed in accordance with the principles of the present invention. The fifth section describes the mass flow meter described in the first through fourth section used as part of a mass flow controller. The sixth section describes an alternate embodiment of a mass flow control system. The final section describes additional considerations that are typically taken into account when designing and constructing a particular implementation of the present invention.

1. Mass Flow Meter System

Figure 1:
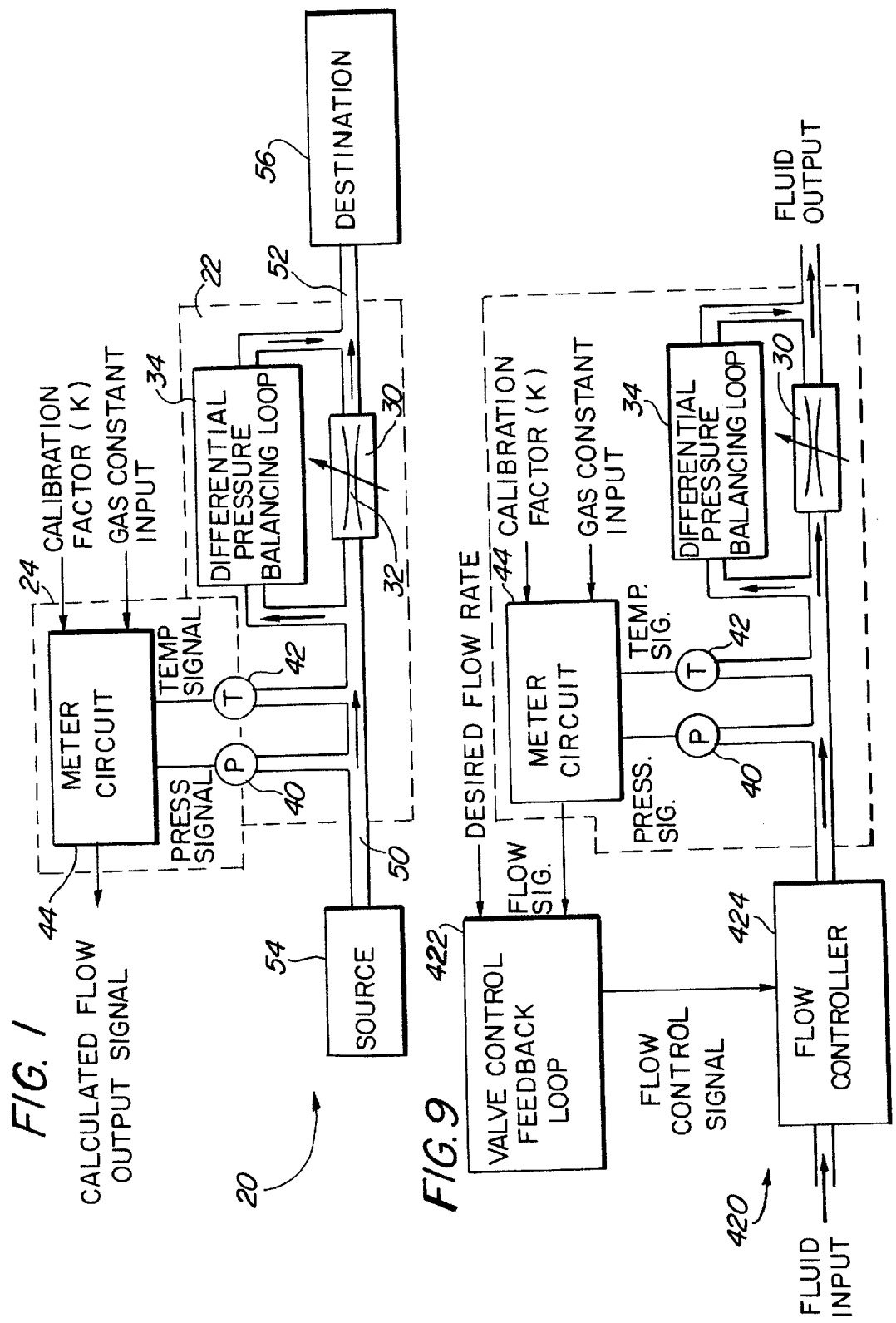
FIG. 1 is a block diagram depicting an exemplary mass flow meter of the present invention.

Referring initially to FIG. 1 of the drawing, depicted at 20 therein is an exemplary mass flow meter system constructed in accordance with, and embodying, the principles of the present invention. The meter system 20 comprises a mechanical system 22 and an electrical system 24. The mechanical system 22 comprises a flow restrictor 30 defining a restriction chamber 32 and a pressure balancing system 34. The electrical system 24 comprises a pressure sensor 40, a temperature sensor 42, and a meter circuit 44.

The mechanical system 22 defines a fluid inlet 50 and a fluid outlet 52. The inlet 50 and outlet 52 are connected to a source or supply 54 of pressurized fluid and a destination 56 of that fluid, respectively.

From the discussion above, it should be apparent that particulars of the source 54 and destination 56 may vary significantly depending upon the environment in which the meter system 20 is used. For example, in a medical environment, the source 54 may be a bottle of pressurized gas and the destination 56 may be a mixer that mixes the gas with air and delivered the mixture to a patient using conventional means. In a manufacturing environment, the source 54 may be a converter that generates a supply of gas from raw materials and the destination 56 may be a reaction chamber in which the gas is used as part of an industrial process. In many cases, the supply pressure at the source 54 and back pressure at the destination 56 may be unknown and/or variable.

The meter system 20 of the present invention is thus intended to be used as part of a larger system in which pressurized fluid thus flows from the source 54 to the destination 56 through the mechanical system 22. The pressure balancing system 34 maintains a constant differential pressure across the restriction chamber 32.

As depicted in FIG. 1, the exemplary flow restrictor 30 is variable. In particular, when the meter system 20 is calibrated the flow restrictor 30 defines a predetermined geometry and an effective cross-sectional area of the restriction chamber 32. In the exemplary system 20, the flow restrictor 30 may be changed to alter the geometry, and in particular the effective cross-sectional area, of the restriction chamber 32. In other embodiments of the present invention, the flow restrictor 30 need not be variable, but instead can be fabricated with a preset geometry and effective cross-sectional area. This may or may not include a standard orifice, sonic orifice, laminar flow element of various geometries, or a variable area restriction. The use of a preset or variable flow restrictor may affect the process of calibrating the meter system 20 as will be discussed below.

The pressure balancing system 34 is preferably a flow controller that utilizes a mechanical regulation system to maintain a constant differential pressure across the restriction chamber 32 even if the source and destination pressures are unknown or variable. Such mechanical flow controllers are disclosed, for example, in U.S. Pat. No. 6,026,849 issued Dec. 2, 1999, and copending U.S. patent application Ser. No. 09/805,708 filed Mar. 13, 2001 and commonly assigned with the present application. However, the pressure balancing system 34 may also be an electro-mechanical flow controller as disclosed in the '708 application. The teachings of the '849 patent and the '708 application are incorporated herein by reference.

The pressure and temperature sensors 40 and 42 are preferably electro-mechanical transducers that convert pressure and temperature values into an electrical signal. These sensors 40 and 42 are operatively connected to the mechanical system 22 to generate electrical signals indicative of the pressure and temperature, respectively, of the fluid flowing through the mechanical system 22.

The meter circuit 44 stores or otherwise has access to calibration data relating mass flow rate to pressure and temperature for a given fluid. The calibration data includes a calibration factor calculated for a given restrictor 30 and a gas constant determined by the characteristics of the gas flowing through the meter system 20. The gas constant is based on the specific gas density or viscosity as related to temperature changes.

Based on the calibration data and the pressure and temperature signals, the meter circuit 44 generates a flow output signal corresponding to the mass flow of fluid through the mechanical system 22. The flow output signal may be recorded or displayed or used as part of a larger circuit for controlling fluid flow from the source 54 to the destination 56.

Figure 2:
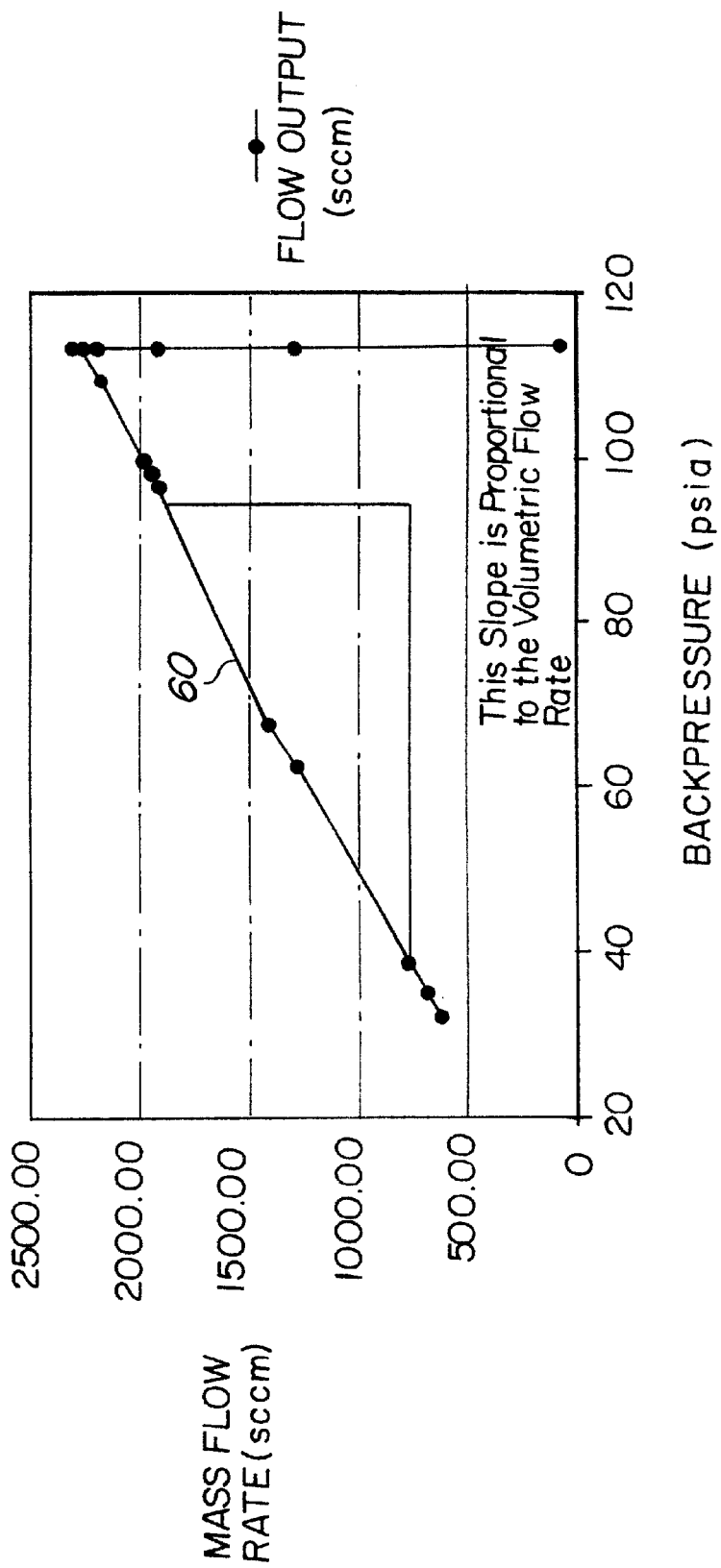
FIG. 2 is an exemplary plot of mass flow through the meter versus fluid pressure illustrating the operation of the present invention.

Referring now to FIG. 2, depicted therein at 60 is a plot of pressure versus mass flow through the restrictor 30 when the pressure balancing system 34 is connected across the restrictor 30 as described above. As seen in the figure, the mass flow output increases linearly with outlet pressure. This curve 60 is an effect of the ideal gas law, which relates volume, mass, temperature, and non-linear compressibility effects together as described by the following equation (1):

$$PV = mRTZ \quad (1)$$

Where:

P=pressure, m=mass,

V=volume,

R=Gas Constant (Universal),

T=temperature, and

Z=gas compressibility (in the following discussion, a "˙" above any of these symbols denotes a mass or volume flow rate)

Dividing both sides of the ideal gas law equation by time yields the following rate equation (2):

$$P\dot{V} = \dot{m}RTZ \quad (2)$$

Solving for the rate equation (2) for mass flow rate yields the following mass flow rate equation (3):

$$\dot{m} = \frac{\dot{V}}{RTZ}P \quad (3)$$

Rearranging the terms of the mass flow rate equation yields the following slope equation (4):

$$\frac{\Delta \dot{m}}{\Delta P} = \frac{\dot{V}}{RTZ} = \text{slope of the linear portion of the plot} = \text{CONSTANT}$$

The slope of equation (4) illustrates the relationship between the mass flow rate and pressure for a given system and gas. If the pressure increases, the amount of mass within a certain volume (i.e., density) will increase proportionally if temperature remains constant. Experimental data showed that the temperature only varied by a fraction of a degree throughout the entire experiment. Since the slope of the plot remained constant, the end result was the volumetric flow rate for this device remained constant through the entire pressure range until the pressure differential pressure (i.e., inlet pressure minus outlet pressure) approached a critical value.

In contrast, traditional flow meter devices that rely on pressure measurements must take into account three factors: inlet pressure, inlet temperature, and pressure differential across an orifice. The flow rate across an orifice, or similar flow restriction, is expressed in general terms by the following flow rate equation (5):

$$\dot{m} = K\left[d^2 \frac{1}{\sqrt{1-\left(\frac{d}{D}\right)^4}}\right] \frac{\sqrt{Gp_1}}{ZT_1} \sqrt{p_1 - p_2} \qquad (5)$$

Where:

$p_1$ = gas pressure upstream of the restriction $p_2$ = gas pressure downstream of restriction $T_1$ = temperature upstream of restriction $D$ = flow passage diameter $d$ = restriction hydraulic diameter (effective flow diameter)

$G$ = specific gravity or normalized molecular weight of gas $Z$ = compressibility factor of gas The term K in this flow rate equation (5) is a factor that is determined experimentally during the calibration of a given restriction. The term K is dependent on the geometry of the restriction and expansion factors of the gas such as Joule-Thompson cooling/heating (i.e., the change in temperature caused by a sudden change in pressure). The flow rate equation (5) is only valid for low flows or restrictions that do not create large gas velocities inside of them. When the speed of the gas approaches the speed of sound, the bulk speed of the gas molecules is larger than the speed at which pressure can travel through the medium. The flow properties take on significantly different relationships and are called compressible flows, sonic flows, or choked flows.

Therefore, traditional flow controllers relying on pressure drops employ two pressure sensors and a temperature sensor. Such traditional flow controllers must also have relatively sophisticated electronics capable of calculating flow rate by measuring both pressures, calculating the pressure difference (with custom op amps (analog) or by means of a programmed digital microprocessor and the needed analog to digital converters), and most importantly, by calibrating the device to find out the term K.

With the approach of the present invention, the equation to solve to obtain flow would look like one the following equations (6) or (7):

$$\dot{m} = \frac{K}{R}\frac{P_1}{T_1} \text{ (for a laminar flow restriction)} \qquad (6)$$

or $$\dot{m} = \frac{K}{R}\frac{\sqrt{P_1}}{T_1} \text{ (for an orifice type restriction)} \qquad (7)$$

Where: K is the calibration factor and is determined during calibration as will be discussed below. It should be noted that the constant, R, in Equations (6–10) is not the Universal constant, R, of Equations (1–4). Rather, it is a gas-dependent constant that varies for laminar flow or orifice type restrictions.

The case of some gases where non-ideal compressibility must be taken into account, the following equations (8) and (9) may be used:

$$\dot{m} = \frac{KP_1}{RT_1}\left(\frac{1}{Z(P,T)}\right) \text{ (for a laminar flow restriction)} \qquad (8)$$

or $$\dot{m} = \frac{K\sqrt{P_1}}{RT_1}\left(\frac{1}{Z(P,T)}\right) \text{ (for an orifice type restriction)} \qquad (9)$$

Where: Z(P,T) is the compressibility factor that is dependent on pressure and temperature.

As can be seen by a comparison of equation (5) with any of the equations (6), (7), (8), or (9), the present invention greatly simplifies the relationship of mass flow rate to pressure and temperature. In most cases, compressibility does not need to be obtained directly, because the controller will be calibrated such that compressibility is accounted for in the calibration sequence.

At a given temperature and pressure, the gas may already be showing some non-ideal compressibility that will be inherent in the measurement taken by the flow standard during calibration. In addition, the term R is gas specific, so only the gas specific constant needs to be entered before or during calibration to have a highly accurate mass flow measurement. The calibration sequence may be implemented as will be described below with reference to FIG. 5.

After the calibration factor K is calculated using the calibration sequence, mass flow may be measured using only the following linear slope equation (10) defining the slope of the plot 60 depicted in FIG. 2:

$$Y = mx + b \qquad (10)$$

Where: y=mass flow, x=measured pressure, m=K/RT, and b is the zero offset.

With the foregoing basic understanding of the meter system 20 in mind, the various components of this system will now be described in further detail below.

II. Mechanical System

Figure 3:
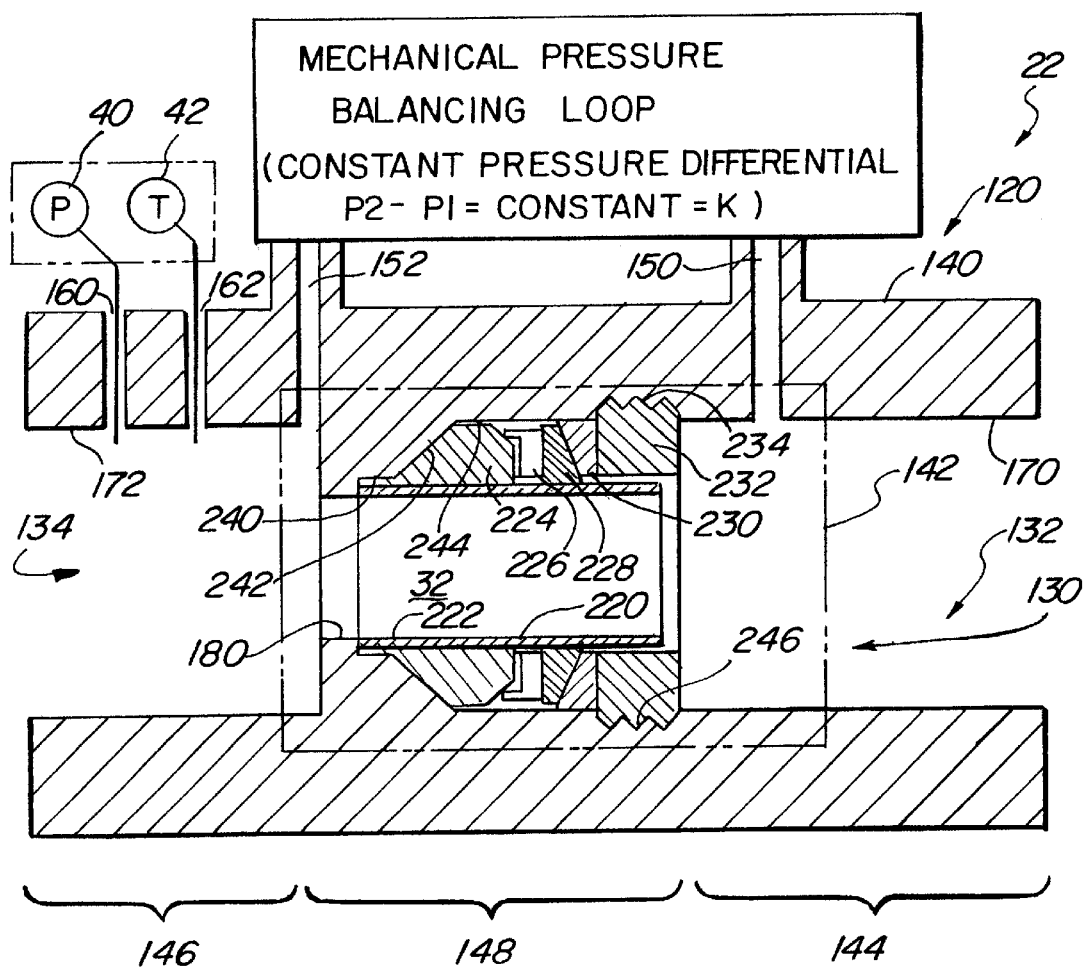
FIG. 3 is a somewhat schematic section view depicting an exemplary mechanical system that may be used to implement a mass flow meter as depicted in FIG. 1.

Referring now to FIG. 3 of the drawing, depicted in detail therein is the mechanical system 22 of the exemplary flow meter system 20. The restrictor 30 of the mechanical system 22 is formed by a main body assembly 120. The main body assembly 120 defines a main passageway 130 having an inlet 132 and an outlet 134 and defining the restriction chamber 32. The restriction chamber 32 is arranged between the inlet 132 and the outlet 134.

As generally discussed above, the mass flow meter system 20 measures the mass flow of fluid that flows through the main passageway 130 from the inlet 132 to the outlet 134 using pressure and temperature signals generated by the pressure sensor 40 and the temperature sensor 42. The fluid flowing through the meter system 20 will be referred to herein as the metered fluid. Seals are formed at the junctures of the various parts forming the mechanical system 22 such that metered fluid flows only along the paths described herein; these seals are or may be conventional and thus will not be described in detail.

The exemplary main body assembly 120 comprises a main body member 140 and, optionally, a variable orifice assembly 142. The main body member 140 defines at least a portion of the main passageway 130, the inlet 132, and the outlet 134. The main body member comprises an inlet section 144, an outlet section 146, and a intermediate section 148.

The main body member 140 further defines first and second balancing ports 150 and 152 located upstream and downstream, respectively, of the variable orifice assembly 142. The first and second balancing ports 150 and 152 allow fluid communication between the pressure balancing system 24 and the inlet and outlet sections 144 and 146, respectively, of the main passageway 130. The first balancing port 150 and second balancing port 152 are connected to input and output ports 154 and 156, respectively, of the pressure balancing system 34.

The exemplary pressure and temperature sensors 40 and 42 used by the meter system 20 are arranged to detect the pressure and temperature of the metered fluid flowing through the main passageway 130. In particular, the main body member 140 defines first and second test ports 160 and 162 arranged in the outlet section 146 of the main body member 140. The test ports 160 and 162 may, however, be arranged in the inlet and/or intermediate sections 144 or 148 of the body member 140 in another embodiment of the present invention.

The sensors 40 and 42 are or may be conventional and are inserted or threaded into the test ports 160 and 162. Seals are conventionally formed between the sensors 40 and 42 and the test ports 160 and 162. So attached to the main body member 140, the sensors 40 and 42 generate electrical pressure and temperature signals that correspond to the pressure and temperature of the metered fluid immediately adjacent to the test ports 160 and 162.

The inlet, outlet, and restriction sections 144, 146, and 148 of the main body member 140 serve different functions and thus have different geometries. The inlet and outlet sections 144 and 146 are threaded or otherwise adapted to allow a fluid-tight connection to be made between the main body member 140 and the source 54 and destination 56 of the metered fluid. The effective cross-sectional areas of inlet and outlet sections 144 and 146 are not crucial to any implementation of the present invention except that the flow of metered fluid to the fluid destination 56 must meet predetermined system requirements. In the exemplary main body assembly 120, the inlet and outlet sections 144 and 146 define cylindrical inlet and outlet internal wall surfaces 170 and 172 and have substantially the same diameter and effective cross-sectional area.

The intermediate section 148 of the main body member 140 serves to restrict the flow of metered fluid through the main passageway 130 while still allowing the flow of metered fluid to meet the system requirements. The effective cross-sectional area of at least a portion of the intermediate section 148 of the main passageway 130 is thus smaller than that of the inlet and outlet sections 144 and 146. In particular, the intermediate section 148 is defined at least in part by an internal restriction wall 180 of the main body member 140. The restriction wall 180 is substantially cylindrical and has a diameter smaller than that of the inlet and outlet wall surfaces 170 and 172.

The meter system 20 of the present invention may be manufactured without the optional variable orifice assembly 142. In this case, the restriction wall 180 of the main body member 140 defines the restriction chamber 32. The main body member 40 must be manufactured to tight tolerances and/or the calibration data may need to be calculated for each main body member 140 to account for variations in the restriction portions defined by individual main body members if a variable orifice assembly is not used.

If a variable orifice assembly 142 is used, the restriction chamber 32 associated with a given main body member 140 may be altered to calibrate the given main body member 140. Any number of mechanisms may be used to alter the geometry of the restriction chamber 32.

In the meter system 20, the exemplary variable orifice assembly 142 comprises a tube member 220 having an internal surface 222. The internal surface 222 of the tube member 220 defines the effective cross-sectional area of the restriction chamber 32.

In some situations, the tube member 220 may be made of a rigid material such as some metals or polymers. In this case, the tube member 220 is made in a plurality of predetermined configurations each corresponding to a restriction chamber 32 having a different predetermined cross-sectional area. One of these predetermined configurations is selected to obtain a desired geometry of the restriction chamber 32.

The exemplary tube member 220 is, however, made of a deformable material such that, when the tube member 220 is deformed, the effective cross-sectional area of the restriction chamber 32 is changed. The exemplary tube member 220 is made of metal, but polymers, natural rubber, or other materials may be used depending upon the circumstances. In this respect, the tube member 220 may be made of elastic (e.g., polymers or natural rubber) or non-elastic (e.g., metal) material.

The variable orifice assembly 142 used by the exemplary meter system 20 further comprises a compression wedge 224, a compression shim 226, first and second chevron members 228 and 230, and a compression nut 232 having a threaded surface 234.

To accommodate this variable orifice assembly 142, the intermediate section 148 of the exemplary main body member 140 comprises the following interior walls in addition to the restriction wall 180: a tube seat wall 240, a compression wall 242, a spacing wall 244, and a threaded wall 246. The tube seat wall 240 is located upstream of the restriction wall 180 described above and is generally cylindrical. The compression wall 242 is located upstream of the tube seat wall and is generally conical. The spacing wall 244 is located upstream of the compression wall and is generally cylindrical. The threaded wall 246 is located upstream of the spacing wall and is threaded to mate with the threaded surface 232 of the compression nut 230.

Axial rotation of the compression nut 230 relative to the body member 140 thus causes the nut 230 to be displaced along a longitudinal axis A of the body member 140 towards the restriction wall 180. As the nut 230 moves towards the restriction wall 180, the nut 230 applies a force on the compression wedge 224 through the chevron members 228 and 230 and compression shim 226. The compression wedge 224 comprises a conical outer surface 250. The outer surface 250 of the compression wedge 224 engages the compression wall 242 such that the wedge 224 moves radially inwardly towards the longitudinal axis A. The inward movement of the compression wedge 224 deforms, as generally described above, the tube member 220 to alter the effective cross-sectional area of the restriction chamber 32.

III. Electrical System

Figure 4:
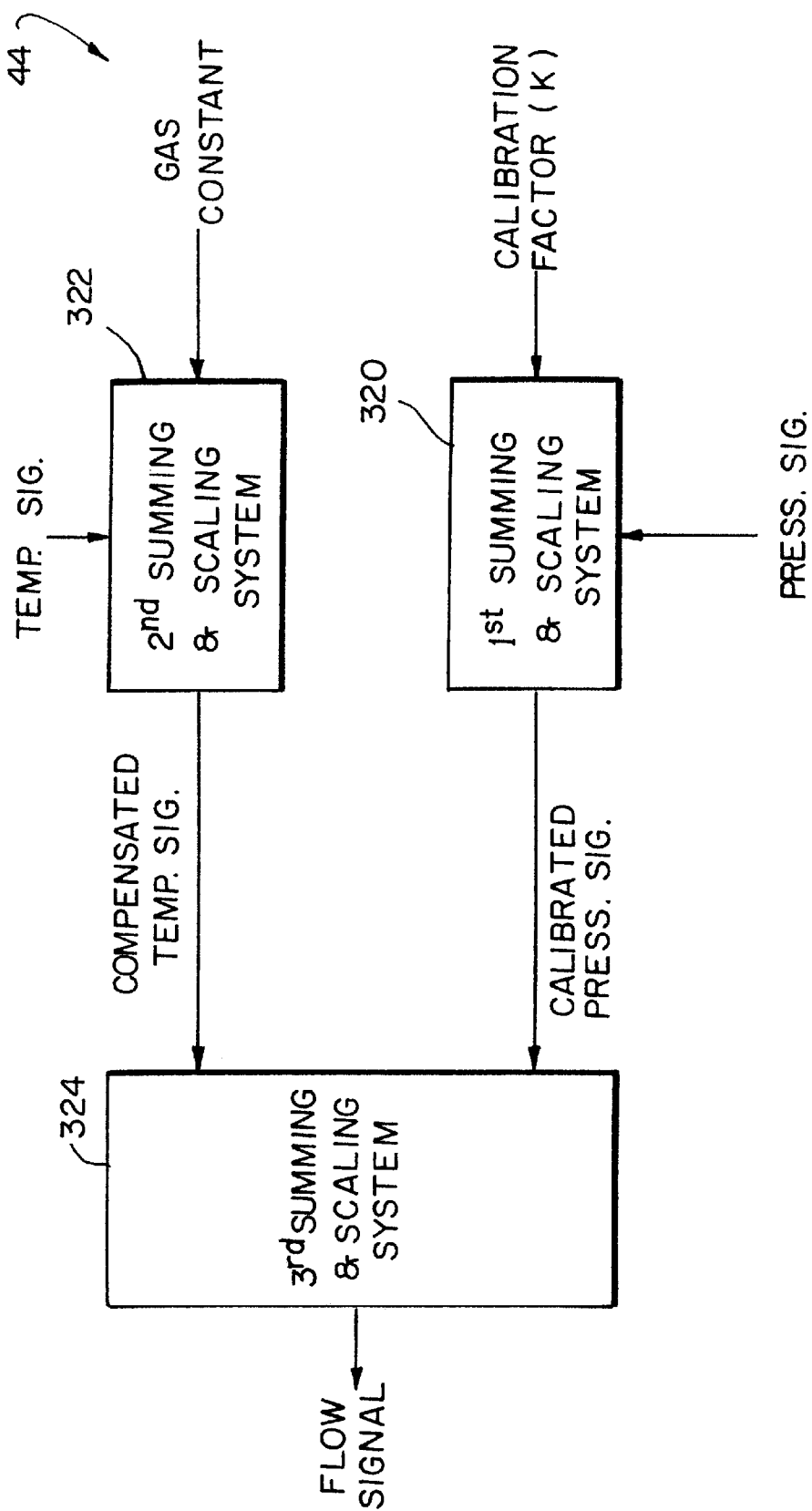
FIG. 4 is a block diagram of a meter circuit employed by the mass flow meter of FIG. 1.

Referring now to FIG. 4 of the drawing, depicted in detail therein is one exemplary embodiment of a meter circuit 44 used as part of the electrical system 24 of the exemplary flow meter system 20. The meter circuit 44 comprises first, second, and third summing and scaling systems 320, 322, and 324. The first summing and scaling system 320 combines the calibration factor and raw pressure signal to obtain a calibrated pressure signal. The second summing and scaling system 322 combines the raw temperature signal and the gas constant input to obtain a compensated temperature signal. The third summing and scaling system 324 combines the calibrated pressure signal and the compensated temperature signal to obtain the flow output signal.

The design details of the summing and scaling systems 320–324 will be determined by the specific environment in which the meter system 20 is to be used. Typically, these systems 320–324 will comprise signal specific components and a summing and scaling amplifier. The signal specific components convert a raw input signal in either analog or digital form into a digital or analog conditioned signal suitable for use by the summing and scaling amplifier associated with the signal specific components. The summing and scaling amplifier in turn is designed to generate a scaled signal based on the conditioned input signals.

The meter circuit 44 may be implemented using discrete circuit components, an application specific integrated circuit (ASIC), software running on an integrated processor such as a general purpose microcomputer or a digital signal processor, or a combination of these methods. The exact nature of any given implementation the electrical system 24 will depend upon such factors as manufacturing costs, the designers background and experience, and the operating environment of the meter system 20. For example, in an embodiment of the present invention implemented with a digital signal processor ("DSP"), the DSP preferably comprises a memory unit having look-up tables that store calibration conditions including but not limited to the original calibration conditions for the meter. This data is useful for reference back to original conditions in the case of pressure and/or temperature sensor drift. The data is also useful for conducting diagnostic procedures to determine whether the meter requires calibration or other service. Additionally, the DSP memory unit preferably has a look-up table of fluid viscosity vs. temperature for one or more fluids. This data is useful for use in compensating for changes in fluid temperature.

Figure 5:
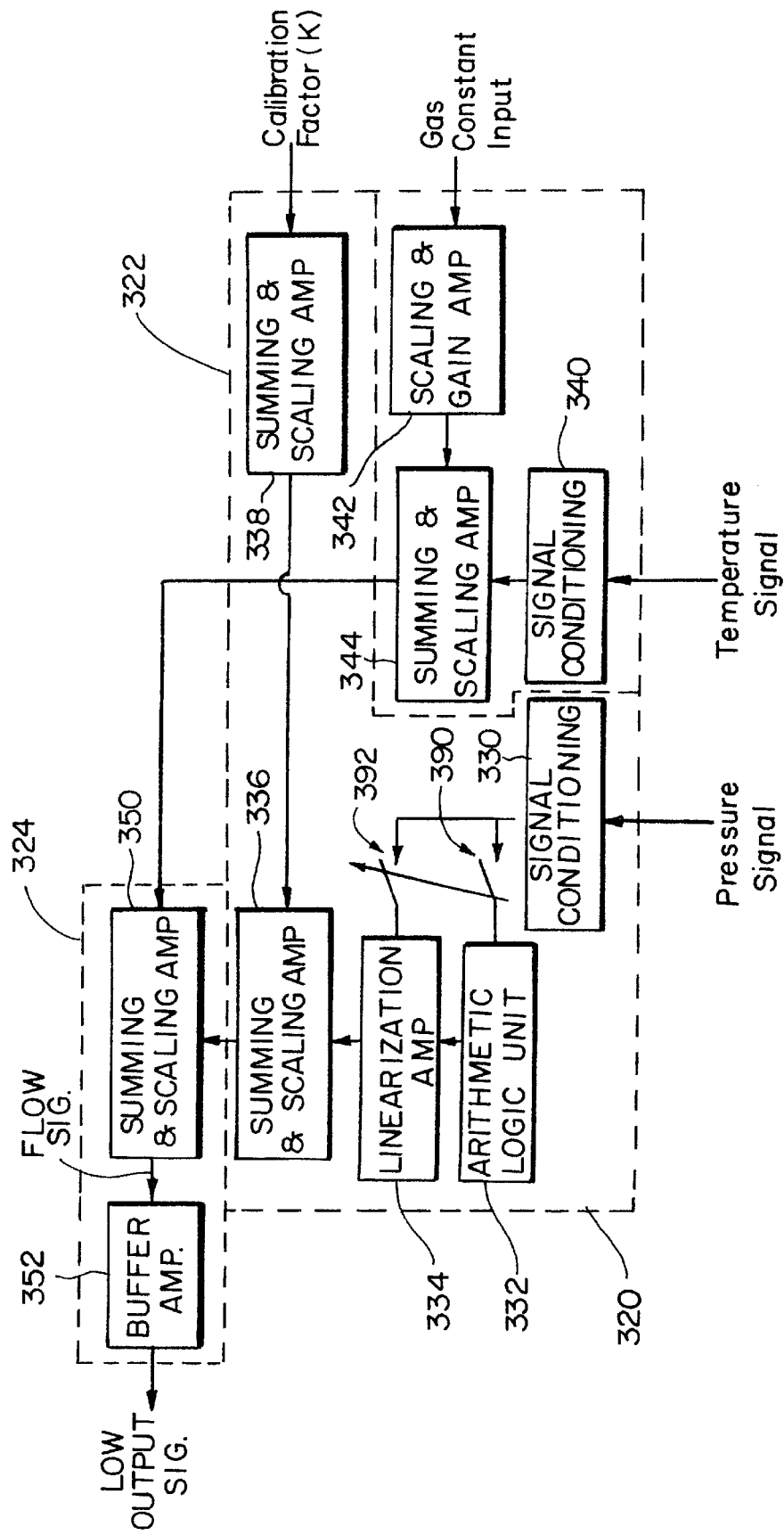
FIG. 5 is a detailed block diagram of an exemplary meter circuit that may be employed by a mass flow meter employing the principles of the present invention.
Figure 6:
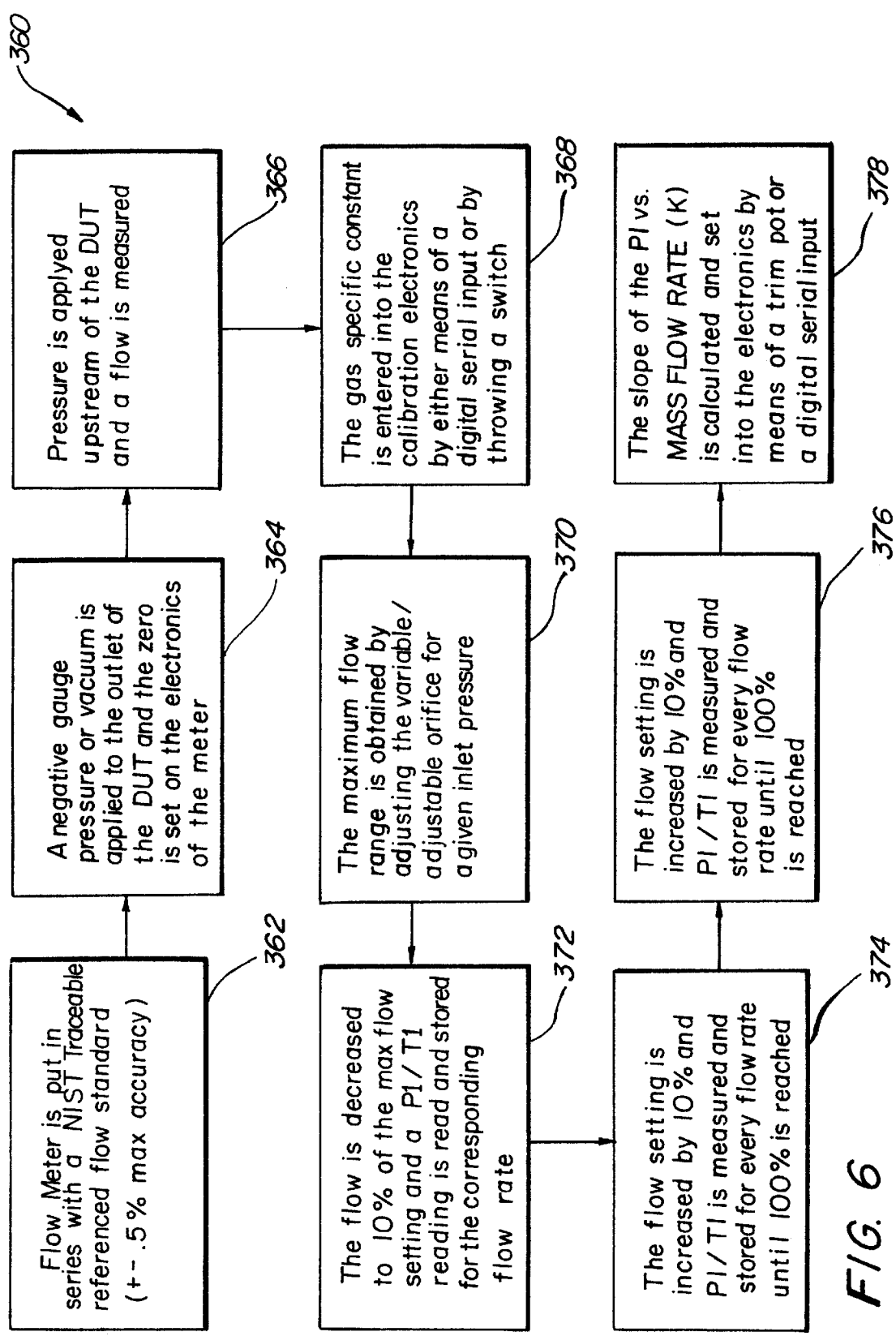
FIG. 6 is a flow diagram representing one exemplary method of calibrating the mass flow meter of FIG. 1.

Referring now to FIG. 5, depicted therein is one exemplary meter circuit 44 adapted to generate the flow output signal based on analog input signals. As shown in FIG. 5, the first summing and scaling system 320 comprises a signal conditioning module 330, an optional arithmetic logic unit 332, an optional linearization amplifier 334, and a first and second summing and scaling amplifiers 336 and 338.

The raw pressure signal is initially filtered and amplified by the signal conditioning module 330. If necessary, the filtered pressure signal is then applied to one or both of the arithmetic logic unit 332 and linearization amplifier 334 and then to the first summing and scaling amplifier 336. If the arithmetic logic unit 332 and linearization amplifier 334 are not required, the filtered pressure signal is directly passed to the first summing and scaling amplifier 336. The second summing and scaling amplifier 338 generates a calibration signal based on the calibration factor. The pressure signal and calibration signal are then applied to the first summing and scaling amplifier 336 to obtain the processed pressure signal.

The second summing and scaling system 322 comprises a signal conditioning module 340, a scaling and gain amplifier 342, and a summing and scaling amplifier 344. The signal conditioning module 340 filters and amplifies the temperature signal to obtain a filtered temperature signal. The scaling and gain amplifier 342 generates a gas constant signal based on the gas constant input. The summing and scaling amplifier 344 generates the processed temperature signal based on the filtered temperature signal and the gas constant signal.

The third summing a scaling system 324 comprises a summing and scaling amplifier 350 and a buffer amplifier 352. The summing and scaling amplifier generates a flow signal based on the calibrated pressure signal and the compensated temperature signal as generally described above. The buffer amplifier 352 generates the flow output signal based on the flow signal.

IV. Calibration Process

Referring now to FIG. 5 of the drawing, depicted therein at 360 is a flow diagram of one exemplary process for calibrating the meter system 20 described above. In the following discussion, the particular meter system 20 being calibrated will be referred to as the DUT.

The first step 362 of the calibration process is to connect the flow restrictor 30 of the DUT in series with a calibrated meter system. A negative gauge pressure or vacuum is then applied at step 364 to the outlet of the flow restrictor 30 of the DUT, and the electronics of the meter system 20 are set to zero.

The next step 366 is to apply pressure upstream of the DUT to create flow through the DUT. The flow is measured using the calibrated meter system. The gas specific gas constant input is then applied at step 368 to the electronic portion 24 using conventional means such as a digital serial input and/or a set of one or more switches that can be configured to generate the appropriate gas constant input.

The maximum flow range is then obtained at step 370 by selecting an appropriate geometry of the restriction cavity 32 by any one of the methods described above.

The flow is then decreased at step 372 to ten percent of the maximum flow setting of the DUT. The pressure and temperature signals associated with that flow are then read and stored. At step 374, the flow rate is increased in increments of ten percent up to one hundred percent. The pressure and temperature signals associated with each incremental increase in flow rate are measured and stored. The slope of plot of the pressure signal versus the mass flow rate measured at step 378 by the calibrated meter system is measured and stored as the calibration factor using conventional means such as a trim pot or digital serial input.

Figure 7:
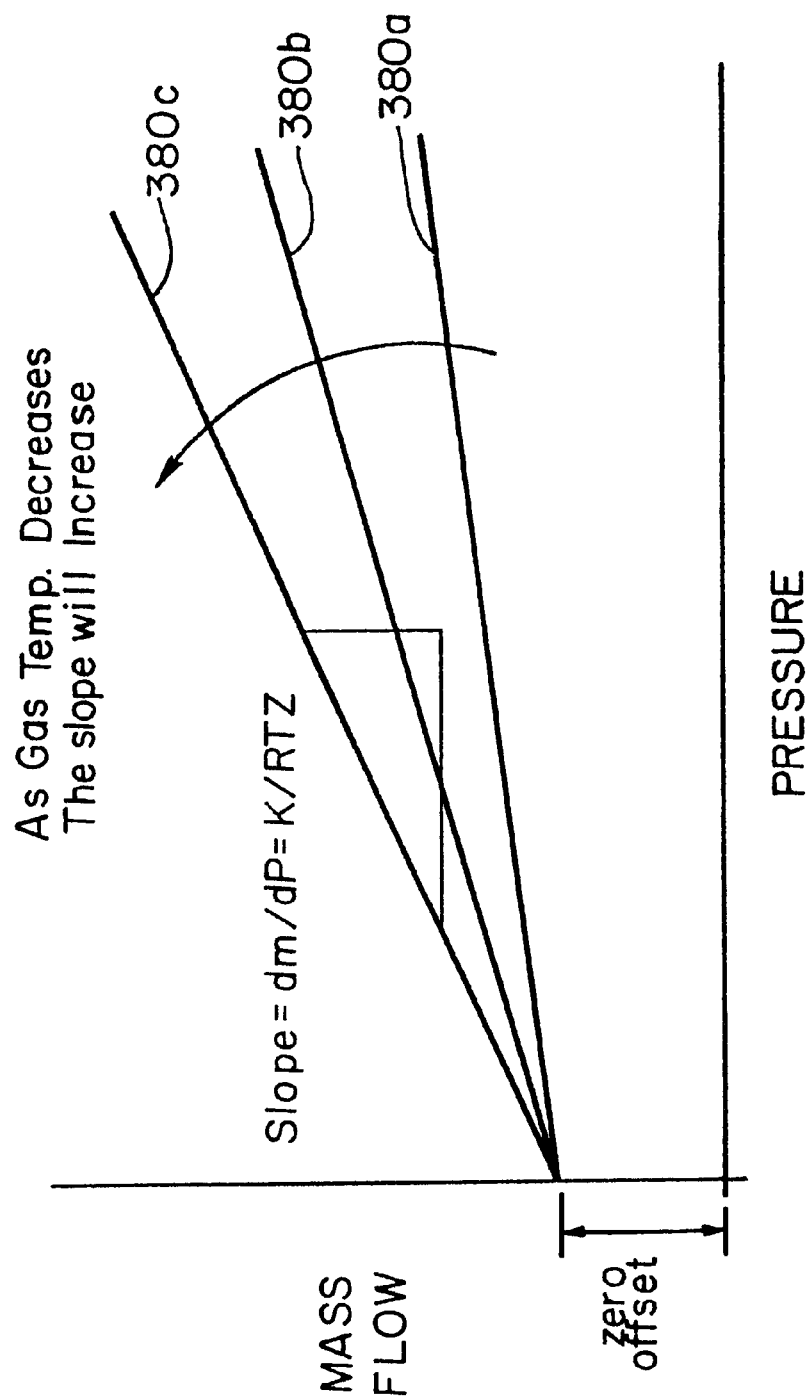
FIG. 7 is a plot of mass flow through the meter versus fluid pressure for several different fluid temperatures illustrating compensation for different fluid temperatures.

Referring to FIG. 7, depicted at 380a, 380b, and 380c therein are exemplary plots of pressure signal versus mass flow rate for several temperatures. The meter circuit 44 generates the flow signal output signal based on the pressure/mass flow plots created by the calibration factor and gas constant input.

Figure 8:
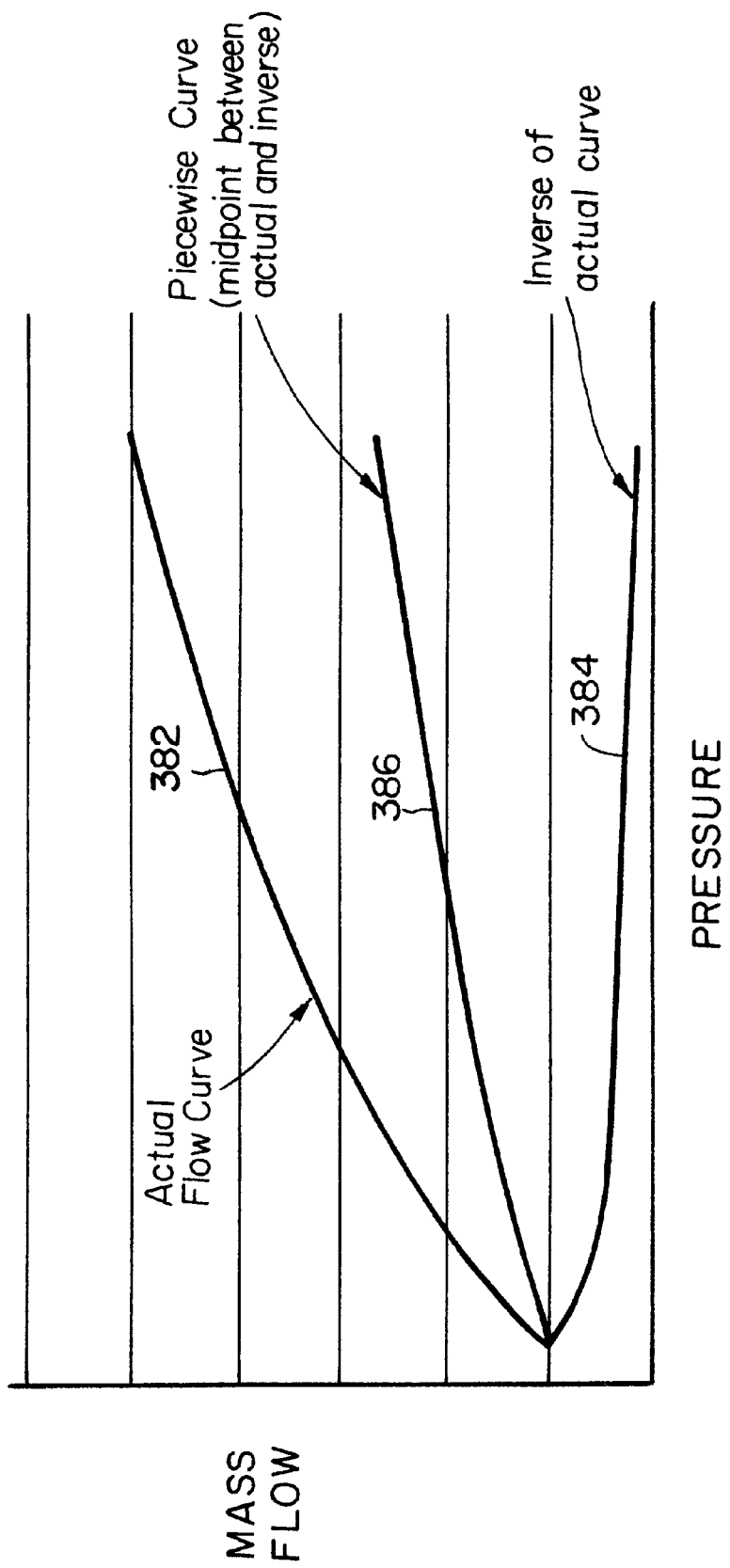
FIG. 8 is an exemplary plot of mass flow through the meter versus fluid pressure illustrating the basic principles of operation of the present invention applied to a non-linear mass flow output.

Referring now to FIG. 8, depicted therein is a plot 382 of the pressure signal versus mass flow rate in which the relationship between the pressure signal and mass flow rate is non-linear. For example, this relationship may be non-linear in the case of an orifice.

If the pressure/mass flow rate relationship is non-linear, the filtered pressure signal will be passed through one or both of the arithmetic logic unit 332 and linearization amplifier 334. The arithmetic logic unit 332 and linearization amplifier 334 implement a function that compensates for the non-linearity of the pressure/mass flow rate relationship. For example, the signal conditioning circuitry may perform one or both of a "piecewise linearization" function or a square root function on the filtered pressure signal to obtain the compensated pressure signal. In particular, referring back to FIG. 8, depicted at 384 is a curve corresponding to the inverse of the non-linear curve 382. A curve 386 represents the midpoint of the curves 382 and 384 and can be used in the linear slope equation (10) described above.

In practice, the meter circuit 44 is preferably manufactured with both the arithmetic logic unit 332 and linearization amplifier 334 and, as shown in FIG. 5, switches 390 and 392 configured to allow either of these circuit elements 332 and 334 to be removed from the circuit 44. The use of the switches 390 and 392 thus allows the production of a standard meter circuit 44 that can easily be customized for a particular environment.

V. Mass Flow Control System

As generally described above, the mass flow meter of the present invention described above has numerous applications. It can be used alone simply to measure mass flow rate of a wide variety of fluids at a wide variety of flow rates. It can be used as part of a larger system of processing or administering fluids where accurate mass flow rates are important. It can also be combined with other components to obtain a more complex stand alone device.

Described in this section with reference to FIG. 9 is an exemplary mass flow control system 420 that incorporates the exemplary mass flow meter 20 described above. The mass flow control system 420 is a stand alone device that not only measures mass flow rate but allows this flow rate to be controlled with a high degree of accuracy for a wide variety of fluids and flow rates.

The mass flow control system 420 incorporates the flow meter system 20 described above, and the meter portion of the flow control system 420 will not be described again except to the extent necessary for a complete understanding of the flow control system 420.

In addition to the flow meter system 20, the flow control system 420 comprises a valve control feedback loop system 422 and a flow controller system 424. The flow controller system 424 is arranged in series with the flow meter system 20 such that the flow controller system 424 determines the mass flow of fluid through the flow meter system 20.

Preferably, the flow controller system 420 is a mechanical or electro-mechanical flow controller such as is described in the '849 patent and '708 application cited above. The flow controller system 424 may, however, be any flow controller system that can increase or decrease the flow of fluid through the system 420 under electrical or mechanical control.

In the present invention, the flow signal generated by the summing and scaling amplifier 350 of the third summing and scaling system 324 is applied to the valve control feedback loop system 422. The valve control feedback loop system 422 compares the flow signal with a desired flow rate signal. The desired flow rate signal may be preset or may be changed as required by the circumstances. For example, in a medical setting, a doctor may prescribe that a gas be applied to a patient at a predetermined flow rate. The predetermined flow rate determined by the doctor would be converted into the desired flow rate signal.

Based on the difference between the desired flow rate signal and the flow signal generated by the flow meter system 20, the valve control feedback loop system 422 generates a flow control signal that controls the flow controller system 424. If the flow controller system 424 is a mechanical system, the flow control signal will be in the form of mechanical movement (rotational, translational) that operates the flow controller signal to increase or decrease the fluid flow rate through the system 424. If the system 424 is an electro-mechanical system, the flow control signal may take the form of an electrical signal that is converted to mechanical movement at the system 424.

The combination of the flow controller system 424 and the flow meter system 20 results in the fluid output of the system 420 being controllable to a high degree of accuracy.

VI. Alternative Embodiment of Mass Flow Control System

Figure 10:
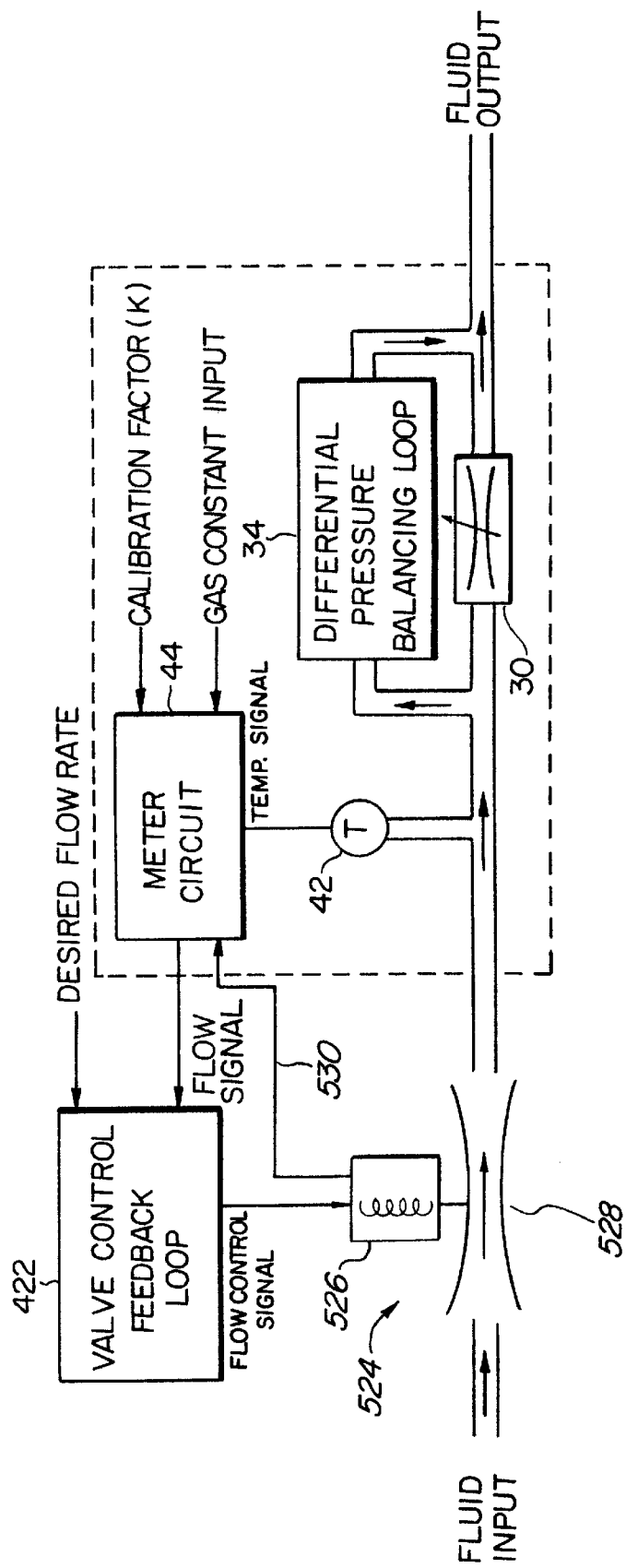
FIG. 10 is a block diagram of an alternate embodiment of a flow control system.

An alternative embodiment of the mass flow control system described above and in FIG. 9 is shown in FIG. 10. Specifically, the flow controller 524 comprises either a piezoelectric actuator control or a solenoid actuator control 526 coupled to a valve 528. The actuator control 526 delivers a signal 530 to the meter circuit 44. If the actuator control 526 is a solenoid actuator control then the signal 530 is a current signal is converted to a voltage signal. If the actuator control 526 is a piezoelectric actuator control, the signal 530 is a voltage signal from an integrated strain gauge. In either instance, the signal 530 can be identified as $V_{pm}$, i.e., Voltage (prime mover).

The signal 530 represents the relationship between the Lorentz force generated in the actuator control 526 by changes in pressure in the valve 528. Hence, the signal 530 can be used as an indirect pressure indicator replacing, augmenting and/or calibrating the pressure transducer 40 in FIG. 1. For example, in FIG. 10, the pressure transducer 40 is not present and the signal 530 is used in its stead. The signal 530 can also be used as a diagnostic indicator to verify that the value of R for a given flow restriction has not changed.

Preferably, the meter circuit 44 for the mass flow control system shown in FIG. 10 has at least 128 kilobytes of memory using EEPROM. The memory for the meter circuit 44 should contain a look up table of values of $V_{pm}$ for incremental mass flow rates for various gases and/or flow restrictions. This look-up table preferably represents values for the equation:

$$\dot{m} = \frac{KV_{pm}}{RT} \qquad (11)$$

Thus, an alternative embodiment using a signal 530, $V_{pm}$, to measure changes in pressure in the system and to control the valve 528 in the mass flow control system is described above.

VII. Additional Considerations

A designer will typically design a particular implementation of the present invention by initially determining the operating environment in which the flow meter system is to be used. The operating environment will include the properties of the fluid itself, the expected range of fluid input and output pressures, the ambient conditions, the tolerance for error, and the like. The designer may also consider commercial factors such as cost.

The properties of many of both the mechanical and electrical components of the present invention will be changed depending upon the circumstances to "tune" a specific flow meter system for a particular use.

For example, the restriction chamber and inlet and outlet openings may be selected based on the type of fluid, expected inlet pressures, and desired flow rates.

In addition, the materials used for the various components must be selected based on the pressures and types of fluids expected. For example, for air at low pressures, plastic may be used for many of the components. For caustic fluids and higher pressures, steel or stainless steel may be used.

The electronics will also be customized for a particular environment. For example, the implementation details of the various summing and scaling systems described above will be determined once the particular operating environment is defined.

Accordingly, the present invention may be embodied in forms other than those described herein without departing from the spirit or essential characteristics of the invention. The present embodiments are therefore to be considered in all respects as illustrative and not restrictive, the scope the invention being indicated by the appended claims rather than by the foregoing description; and all changes which come within the meaning and range of equivalency of the claims are therefore intended to be embraced therein.

What is claimed is:

1. A mass flow meter comprising:
   an inlet with a diameter and an outlet with a diameter;
   a flow restrictor having a restriction chamber and a pressure balancing system interposed between the inlet and outlet;
   the restriction chamber having a cylindrical restriction wall with a diameter less than the diameters of the inlet and outlet; and,
   a pressure sensor and a temperature sensor upstream from the flow restrictor providing input to a meter circuit having calibration data; whereby the meter circuit generates a flow output signal based on the calibration data and the input from the pressure sensor and temperature sensor.

2. The mass flow meter of claim 1 where the restriction wall defines the restriction chamber.

3. A mass flow meter comprising:
   an inlet with a diameter and an outlet with a diameter;
   a flow restrictor having a restriction chamber and a pressure balancing system interposed between the inlet and outlet;
   the restriction chamber having a cylindrical restriction wall with a diameter less than the diameters of the inlet and outlet; a conical compression wall located upstream from the restriction wall; a variable orifice assembly, the variable orifice assembly having a deformable tube member having an internal surface defining an effective cross-sectional area of the restriction chamber; a compression wedge; a compression shim; first and second chevron members; and, a compression nut;
   whereby axial rotation of the compression nut displaces the nut towards the restriction wall, as the nut moves toward the restriction wall; the nut applies a force on the compression wedge through the first and second chevron members and compression shim and forces the compression wedge radially inwards deforming the deformable tube member and reducing the effective cross-sectional area of the restriction chamber; and,
   a pressure sensor and a temperature sensor upstream from the flow restrictor providing input to a meter circuit having calibration data; whereby the meter circuit generates a flow output signal based on the calibration data and the input from the pressure sensor and temperature sensor.

4. The mass flow meter of claim 1 where the meter circuit further comprises:
   a first summing and scaling system that combines the calibration data and the pressure signal to obtain a calibrated pressure signal;
   a second summing and scaling system that combines the temperature signal and a gas constant to obtain a compensated temperature signal; and,
   a third summing and scaling system that combines the calibrated pressure signal and the compensated temperature signal to obtain the flow output signal.

5. The mass flow meter of claim 4 where the meter circuit is implemented on an application specific integrated circuit.

6. The mass flow meter of claim 4 where the meter circuit is implemented on a digital signal processor.

7. The mass flow meter of claim 6 where the meter circuit further comprises a memory unit for storing calibration conditions.

8. The mass flow meter of claim 4 where the first summing and scaling system comprises:
   a signal conditioning module;
   an arithmetic logic unit;
   an optional linearization amplifier; and,
   a first and second summing and scaling amplifier.

9. The mass flow meter of claim 4 where the second summing and scaling system comprises:
   a signal conditioning module;
   a scaling and gain amplifier; and,
   a summing and scaling multiplier.

10. The mass flow meter of claim 4 where the third summing and scaling systems comprises:
    a summing and scaling amplifier; and,
    a buffer amplifier that generates the flow output signal.

11. The mass flow meter of claim 8 where the meter circuit further comprises a switch for removing either the arithmetic logic unit or the linearization amplifier from the circuit.

12. A mass flow control system comprising:
    a flow controller capable of controlling a flow rate through the mass flow control system; said controller connected in series with a mass flow meter;
    said mass flow meter comprising an inlet with a diameter and an outlet with a diameter; a flow restrictor having a restriction chamber and a pressure balancing system interposed between the inlet and outlet; the restriction chamber having a cylindrical restriction wall with a diameter less than the diameters of the inlet and outlet; and, a pressure sensor and a temperature sensor upstream from the flow restrictor providing input to a meter circuit having calibration data; whereby the meter circuit generates a flow output signal based on the calibration data and the input from the pressure sensor and temperature sensor;
    said mass flow meter is connected to a valve control feedback loop system; whereby the mass flow meter sends the flow output signal to the valve control feedback loop system and said feedback system compares the flow output signal with a predetermined flow rate to generate a flow control signal;
    said valve control feedback loop system is connected to the flow controller; whereby said feedback system sends the flow control signal to the flow controller to operate the flow controller to change the flow rate.

13. The mass flow control system of claim 12 where the restriction wall defines the restriction chamber.

14. A mass flow control system comprising:
    a flow controller capable of controlling a flow rate through the mass flow control system; said controller connected in series with a mass flow meter;
    said mass flow meter comprising an inlet with a diameter and an outlet with a diameter; a flow restrictor having a restriction chamber and a pressure balancing system interposed between the inlet and outlet;
    the restriction chamber having a cylindrical restriction wall with a diameter less than the diameters of the inlet and outlet; a conical compression wall located upstream from the restriction wall; a variable orifice assembly, the variable orifice assembly having a deformable tube member having an internal surface defining an effective cross-sectional area of the restriction chamber; a compression wedge; a compression shim; first and second chevron members; and, a compression nut;

whereby axial rotation of the compression nut displaces the nut towards the restriction wall, as the nut moves toward the restriction wall; the nut applies a force on the compression wedge through the first and second chevron members and compression shim and forces the compression wedge radially inwards deforming the deformable tube member and reducing the effective cross-sectional area of the restriction chamber;

a pressure sensor and a temperature sensor upstream from the flow restrictor providing input to a meter circuit having calibration data; whereby the meter circuit generates a flow output signal based on the calibration data and the input from the pressure sensor and temperature sensor;

said mass flow meter is connected to a valve control feedback loop system; whereby the mass flow meter sends the flow output signal to the valve control feedback loop system and said feedback system compares the flow output signal with a determined flow rate to generate a flow control signal; and, and said feedback system compares the flow output signal with a determined flow rate to generate a flow control signal; and, said valve control feedback loop system is connected to the flow controller; whereby said feedback system sends the flow control signal to the flow controller to operate the flow controller to change the flow rate.

15. The mass flow control system of claim 12 where the meter circuit further comprises:

a first summing and scaling system that combines the calibration data and the pressure signal to obtain a calibrated pressure signal;

a second summing and scaling system that combines the temperature signal and a gas constant to obtain a compensated temperature signal; and, a third summing and scaling system that combines the calibrated pressure signal and the compensated temperature signal to obtain the flow output signal.

16. The mass flow control system of claim 12 where the meter circuit is implemented on an application specific integrated circuit.

17. The mass flow control system of claim 15 where the meter circuit is implemented on a digital signal processor.

18. The mass flow control system of claim 15 where the first summing and scaling system comprises:

a signal conditioning module;

an arithmetic logic unit;

an optional linearization amplifier; and, a first and second summing and scaling amplifier.

19. The mass flow control system of claim 15 where the second summing and scaling system comprises:

a signal conditioning module;

a scaling and gain amplifier; and, a summing and scaling multiplier.

20. The mass flow control system of claim 15 where the third summing and scaling system comprises:

a summing and scaling amplifier; and, a buffer amplifier that generates the flow output signal.

21. A mass flow meter comprising:

an inlet with a diameter and an outlet with a diameter;

a flow restrictor having a restriction chamber and a mechanical pressure balancing system interposed between the inlet and the outlet;

the restriction chamber having a cylindrical restriction wall with a diameter less than the diameters of the inlet and outlet; and, a pressure sensor and a temperature sensor upstream from the flow restrictor providing input to a meter circuit having calibration data; whereby the meter circuit generates a flow output signal based on the calibration data and the input from the pressure sensor and temperature sensor.

* * * * *